United States Patent [19]
Watanabe

[11] Patent Number: 5,893,534
[45] Date of Patent: Apr. 13, 1999

[54] STRUCTURAL APPARATUS AND DESIGN TO PREVENT OIL CAN MOVEMENT OF WEBS IN AIRCRAFT PRESSURE BULKHEADS

[75] Inventor: Masamichi Watanabe, Tacoma, Wash.

[73] Assignee: The Boeing Company, Seattle, Wash.

[21] Appl. No.: 08/577,319

[22] Filed: Dec. 22, 1995

[51] Int. Cl.$^6$ ................................................ B64C 1/10
[52] U.S. Cl. .................. 244/119; 244/131; 29/402.15; 29/897.1; 29/897.2
[58] Field of Search .......................... 244/119, 129.1, 244/131; 29/402.09, 402.14, 402.15, 897.1, 897.2

[56] References Cited

U.S. PATENT DOCUMENTS

| | | | |
|---|---|---|---|
| 2,102,817 | 12/1937 | Weymouth . | |
| 2,382,358 | 8/1945 | Watter | 244/131 |
| 2,392,788 | 1/1946 | Watter | 244/131 X |
| 2,650,185 | 8/1953 | Larson et al. | 244/119 X |
| 3,058,704 | 10/1962 | Bergstedt | 244/119 |
| 3,850,750 | 11/1974 | Furney, Jr. et al. . | |
| 3,920,206 | 11/1975 | Bigham et al. . | |
| 3,976,269 | 8/1976 | Gupta . | |
| 4,728,059 | 3/1988 | Stepen et al. | 244/129.1 X |
| 4,783,228 | 11/1988 | Aker et al. . | |
| 4,828,202 | 5/1989 | Jacobs et al. | 244/119 X |
| 4,858,853 | 8/1989 | Westerman et al. . | |
| 5,242,523 | 9/1993 | Willden et al. | 244/119 X |

*Primary Examiner*—William Grant
*Attorney, Agent, or Firm*—Bernard A. Donahue

[57] ABSTRACT

The problem solved by this invention is to eliminate an oil can movement of the web of an aircraft pressurized bulkhead. A hat section support stiffener is attached to the web by an adhesive. Two end brackets are attached by Hi-Loc bolts to bulkhead stiffeners and the end brackets are attached and arranged to provide a downward pressure on the hat section stiffener to assist in holding it in place. This invention is characterized by the absence of any new fasteners passing through the fatigue critical bulkhead web and also is characterized by the absence of any requirement for removal of existing fasteners, including, but not limited to those passing through the bulkhead web.

1 Claim, 2 Drawing Sheets

STRUCTURAL APPARATUS AND DESIGN TO PREVENT OIL CAN MOVEMENT OF WEBS IN AIRCRAFT PRESSURE BULKHEADS

FIELD OF THE INVENTION

This invention relates to the structural design of aircraft pressurized bulkheads and more specifically, to such designs that will prevent undesired "oil can" movement of the webs of such bulkheads.

BACKGROUND OF THE INVENTION

The structural design of modern aircraft includes pressurized bulkheads, usually located at the aft end of the pressurized cabin within the fuselage of the aircraft.

In the aircraft industry, an "oil can dent", or more commonly an "oil can", is a condition in which a bulge or concavity appears in the pressurized web attached to the primary structural members such as the radial stiffeners of a bulkhead. The web will move with finger pressure accompanied by a popping noise and will either stay in one position or pop back. Those that pop inward when the airplane is depressurized will pop out during pressurization and are termed "working oil cans". This type of oil can should be stabilized if it is desired to prevent movement during each pressurization cycle because the accompanying noise may be disconcerting to passengers within hearing range.

Repairs to cure oil can problems have in the past involved the use of heavy doublers and holes for fasteners through the center areas of the span of the web.

Compared to previous repair configurations for curing an oil can problem, the method and apparatus of this invention is believed to be superior in terms of lighter weight, and the lack of any requirement for fastener holes in the web.

SUMMARY OF THE INVENTION

In a preferred embodiment, this invention provides an apparatus and method for elimination of web oil can movement that is: light in weight; economical to manufacture and install; and safe and reliable. A simple hat section support stiffener is formed into the curvature of the web of a pressure bulkhead in an oil can area. The hat section support stiffener is firmly nested against the web and is held there by first and second end brackets that are attached to existing bulkhead stiffeners which are on each side of the oil can area of the web. There are no additional or new holes in the web required to install this apparatus on the pressure bulkhead. Also, there are no existing fasteners that are required to be removed in order to install this apparatus.

DESCRIPTION OF THE PREFERRED EMBODIMENT

Figure 1:
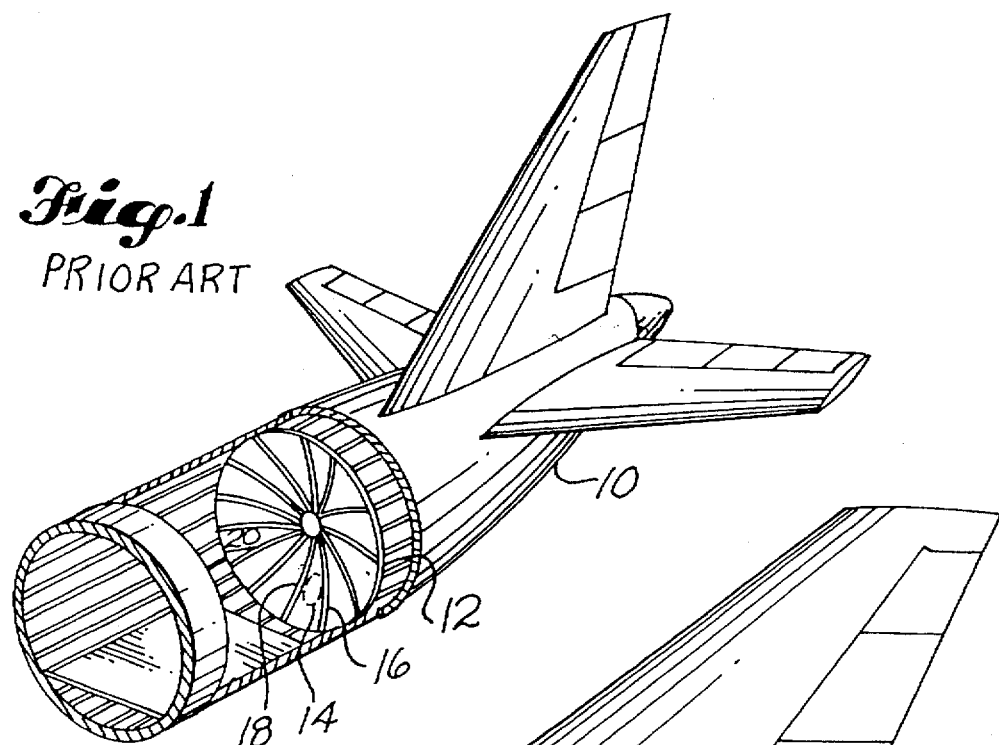
FIG. 1 is a prior art isometric cutaway view of the aft section of the passenger section and empennage of an aircraft with the section cut away to show the pressure bulkhead.
Figure 2:
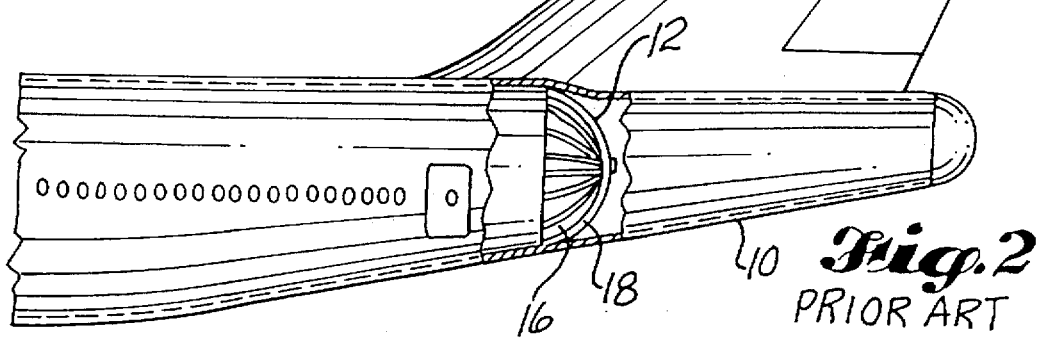
FIG. 2 is a prior art side elevation view of the empennage and aft section of an aircraft with the fuselage cut away to show the pressure bulkhead.

FIGS. 1 and 2 show the aft end of an aircraft 10, with cut away sections to show a pressure bulkhead 12. An oil can area 14 is schematically shown by dotted lines in an oval pattern between radial bulkhead stiffeners 16 and 18. A thin gage bulkhead web 20 is attached to all radial bulkhead stiffeners. The dotted line 14 schematically depicts an oil can bulge (web 20 moves forward) or concavity (web 20 moves aft). The bulge or concavity can be returned to its original contour by finger pressure on the unpressurized web 20.

Figure 3:
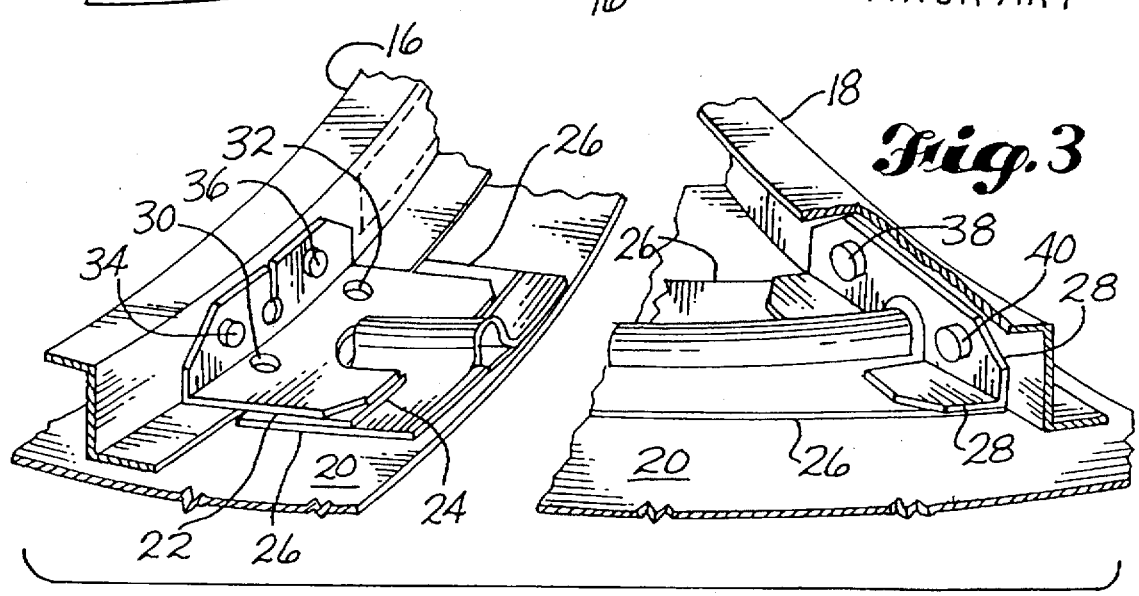
FIG. 3 shows an isometric cut away view showing the arrangement of parts of this invention.

FIG. 3 is an isometric cutaway view of the apparatus of this invention. Radial stiffeners 16 and 18 are the Z section members which are on each side of the web area near the oil can area 14, as schematically shown in FIG. 1. A first end bracket 22 is attached by two Hi-Loc bolts, 34 and 36, to the web of the Z section radial bulkhead stiffener 16. A filler plate 24 is located between the hat section 26 and the first end bracket 22 to compensate for the fact that the lower flange of stiffener 16 is thicker than the flange of the hat section 26. FIG. 3 shows a second end bracket 28 which is attached, by two Hi-Loc bolts, 38 and 40, to the web of the bulkhead stiffener 18. Note that the two Hi-Loc bolts in each of the end brackets 22 and 28 are the only fasteners required to install the apparatus of this invention. Two clearance holes 30 and 32, in the long flange of the first end bracket 22 are sized to have clearance for the existing fastener heads which secure the web 20 to the stiffener 16.

Figure 4:
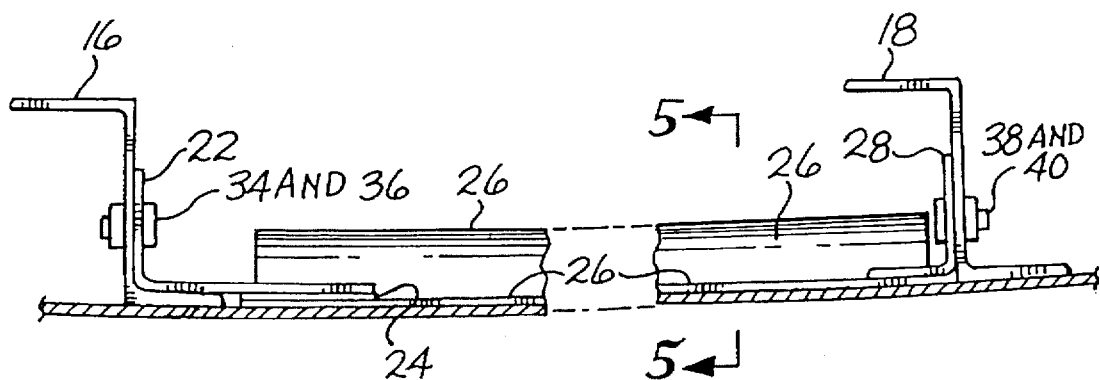
FIG. 4 is a side elevation view showing the installation of parts of this invention between the radial stiffeners of the bulkhead.

FIG. 4 Is a side elevation view showing the installation of the parts of this invention located between the Z section radial bulkhead stiffeners 16 and 18 of the pressure bulkhead. The first end bracket 22 is attached to stiffener 16 by Hi-Loc fasteners 34 and 36. The long leg of first end bracket 22 rests against, but is not attached by a fastener to, the lower flange of stiffener 16 and the filler 24. Second end bracket 28 is attached to bulkhead stiffener 18 by Hi-Loc fasteners 38 and 40. The lower flange of the second end bracket 28 rests against, but is not attached by a fastener to, the top surface of the flanges of support stiffener 26. In fact, there are only four Hi-Loc fasteners included in the preferred embodiment of the apparatus of this invention, namely, the two Hi-Loc fasteners that attach each of the two end brackets 22 and 28 to the bulkhead stiffeners 16 and 18.

Figure 5:
FIG. 5 is a cross-section view taken at 5—5 in FIG. 4.

FIG. 5 Is a cross-sectional view of the support stiffener 26 taken through 5—5 in FIG. 4. Support stiffener 26 is a relatively light weight aluminum part that is heat treated after forming. If necessary, the lengthwise stiffener 26 is shaped to match the contour of the pressure bulkhead web 20. This may be accomplished by placing a wooden block at each end of the support stiffener 26 and pushing down on stiffener 26 or hitting it lightly with a wooden block and hammer. This invention is characterized by the absence of any new fasteners passing through the fatigue critical bulkhead web 20. This invention is also characterized by the absence of any requirement for removal of existing fasteners, including, but not limited to, those passing through the fatigue critical bulkhead web 20. The support stiffener 26 is attached to the web 20 with only a BMS 5-95 poly sulfide chromated sealant, which is used both as a sealant and as an adhesive. Upon installation, all mating surfaces are covered with the sealant. This serves to hold the parts in place after they have been placed as shown in FIGS. 3 and 4.

Figure 6:
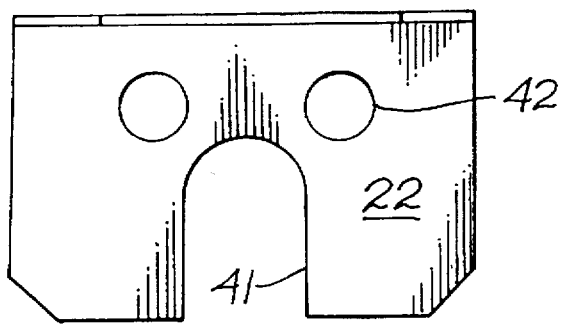

FIG. 6 shows the long flange of the first end bracket 22. A slot 41 is provided to allow clearance for the support stiffener 26 and the first end bracket 22. Two clearance holes 42 are provided in the bracket 22 to allow space for the heads of two existing rivets which need not be removed for this installation. (Web 20 to bulkhead stiffener 16).

Figure 7:
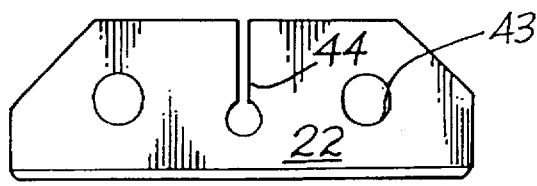
FIGS. 6 and 7 show the two flanges of the first end bracket of this invention.

FIG. 7 shows the short flange of the first end bracket 22. The two holes 43 are for the two Hi-Loc fasteners that attach the first end bracket to the bulkhead stiffener 16. The small hole and narrow slot 44 in this short flange functions as a means to prevent or limit undesired load transfer from the bulkhead stiffener 16 into the light weight parts of the apparatus of this invention. Accordingly, the hole and narrow slot 44 are designed to greatly reduce the stiffness of the first end bracket 22, thereby limiting load transfer to it from bulkhead stiffener 16.

Figure 8:
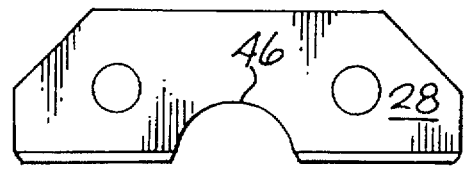
FIGS. 8 and 9 show the flanges of the second end bracket of this invention.
Figure 9:
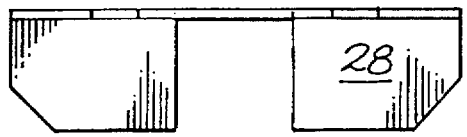

FIGS. 8 and 9 are, respectively, the vertical and horizontal flanges of the second end bracket 28. The two holes in the vertical flange are for Hi-Loc bolt, 38 and 40, attachment to the bulkhead stiffener 18. A semi-circular cutout 46 prevents interference with the support stiffener 26. Also, the cutout 46 greatly reduces stiffness in the second end bracket 28 and limits load transfer thereto from the bulkhead stiffener 18 in the manner previously described in connection with bulkhead stiffener 16.

By way of further information, the method of making a repair to eliminate an oil can is as follows:

1. get access to the forward side of the pressure bulkhead;
2. if necessary put the pressure bulkhead web 20 back to the initial bulkhead contour with finger pressure (normally less than twenty to thirty pounds);
3. find the location where the end brackets 22 and 28 will be installed;
4. make a mark at the center of the oil can area;
5. put the end brackets 22 and 28 into a position so that:
6. the support stiffener 26 is aligned through the center of the oil can area; and
7. the support stiffener is substantially perpendicular to the adjacent pressure bulkhead stiffeners;
8. form the support stiffener to have the same contour as the pressure bulkhead webs which have been moved to the initial contour with finger pressure;
9. put all repair parts in place after coating all mating parts with a sealant and adhesive; and
10. drill the only four fastener holes needed for making the installation of this oil can repair part, namely, the four fastener holes passing through the first and second end brackets (22, 28) and the two bulkhead stiffeners (16,18).

It will be realized by persons skilled in the art, that modifications to the preferred embodiment shown here may be made without departing from the spirit and scope of this invention as defined by the appended claims.

What is claimed is: The embodiments of the invention in which an exclusive property or privilege is claimed are as follows:

1. A repair method for eliminating oil can movement in an aircraft pressure bulkhead comprising:

a. get access to a forward side of a pressure bulkhead;
   b. put a web of the pressure bulkhead back to an initial bulkhead contour with finger pressure;
   c. find a location where end brackets will be installed;
   d. make a mark at the center of the area where oil can movement has occurred;
   e. put the end brackets into a position so that:
      (1) a support stiffener is aligned through the center of the oil can area; and,
      (2) the support stiffener is substantially perpendicular to adjacent pressure bulkhead stiffeners;
   f. form the support stiffener to have the same contour as the pressure bulkhead web which has been moved to the initial contour with finger pressure;
   g. coat mating parts with sealant and adhesive and put said parts in place; and,
   h. drill only four fastener holes, said four fastener holes passing through first and second of said end brackets and two of said bulkhead stiffeners.

* * * * *